(12) United States Patent
Higuchi et al.

(10) Patent No.: US 6,787,698 B2
(45) Date of Patent: Sep. 7, 2004

(54) DRAINAGE STRUCTURE OF ELECTRIC PARTS ACCOMMODATION BOX

(75) Inventors: Eiji Higuchi, Yokkaichi (JP); Yoshihisa Shimada, Yokkaichi (JP)

(73) Assignee: Sumitomo Wiring Systems, Ltd., Mie (JP)

(*) Notice: Subject to any disclaimer, the term of this patent is extended or adjusted under 35 U.S.C. 154(b) by 0 days.

(21) Appl. No.: 10/615,015

(22) Filed: Jul. 9, 2003

(65) Prior Publication Data

US 2004/0007373 A1 Jan. 15, 2004

(30) Foreign Application Priority Data

Jul. 9, 2002 (JP) ........................................ 2002-200355

(51) Int. Cl.[7] .............................................. H02G 3/18
(52) U.S. Cl. .............................. 174/50; 174/58; 174/60; 439/206
(58) Field of Search .............................. 174/50, 58, 60, 174/62, 63; 220/3.8, 4.02; 439/535, 206, 190

(56) References Cited

U.S. PATENT DOCUMENTS 4,609,126 A * 9/1986 Janda .......................... 220/374
4,871,884 A * 10/1989 Hayashi ...................... 174/52.1
5,159,155 A * 10/1992 Nishihara ..................... 174/50
5,645,448 A   7/1997 Hill

FOREIGN PATENT DOCUMENTS

EP          0 930 686 A1    7/1999

* cited by examiner

Primary Examiner—Dhiru R Patel
(74) Attorney, Agent, or Firm—Oliff & Berridge, PLC (57) ABSTRACT

A drainage structure of an electric parts accommodation box includes a drainage port formed on a bottom wall of the box, a cut-out portion that is continuous with the drainage port, a tip of which tapers off to form an acute angle, and a water-leading groove that is continuous with the tip, formed on an outer surface of the bottom wall. With this, a droplet that sticks to the water-leading groove disposed on the outer surface of the bottom wall is brought into contact with a droplet that sticks to the tip of the cut-out portion disposed on an inner surface of the bottom wall to flow out a droplet that sticks to a peripheral edge of the drainage port to the outer surface of the bottom wall. This more effectively drains liquid droplets that would otherwise remain within the box to reduce current leaks caused by such droplets coming into contact with electrical components in the box, such as closely spaced bus bars.

9 Claims, 7 Drawing Sheets

DRAINAGE STRUCTURE OF ELECTRIC PARTS ACCOMMODATION BOX

BACKGROUND OF THE INVENTION

1. Field of Invention

The present invention relates to a drainage structure of an electric parts accommodation box disposed in an engine compartment. More particularly, the present invention is intended to efficiently drain any liquid that has penetrated into a box accommodating a battery fuse mounted on a battery.

2. Description of Related Art

In the electric parts accommodation box disposed in an engine compartment or the like into which water penetrates, water which has penetrated into the electric parts accommodation box is drained from an opening formed in a drainage port provided on a bottom wall thereof, as disclosed in Japanese Utility Model Application Laid-Open Nos. 7-27235 and 7-3233 and Japanese Patent Application Laid-Open No. 9-102264.

Figure 8A:
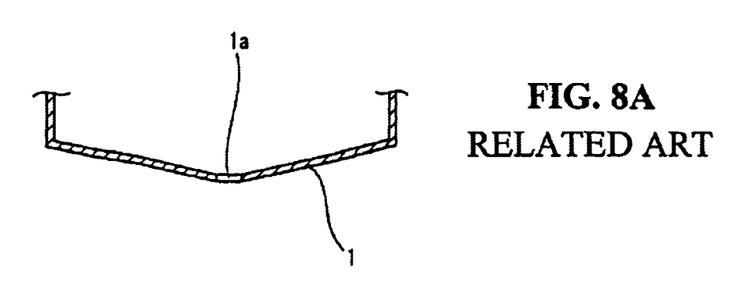
FIG. 8A shows a conventional drainage port.

As shown in FIG. 8A, a bottom wall 1 inclines downward toward a drainage port 1a to collect water inside the electric parts accommodation box to the drainage port 1a and discharge it to the outside.

Figure 8B:
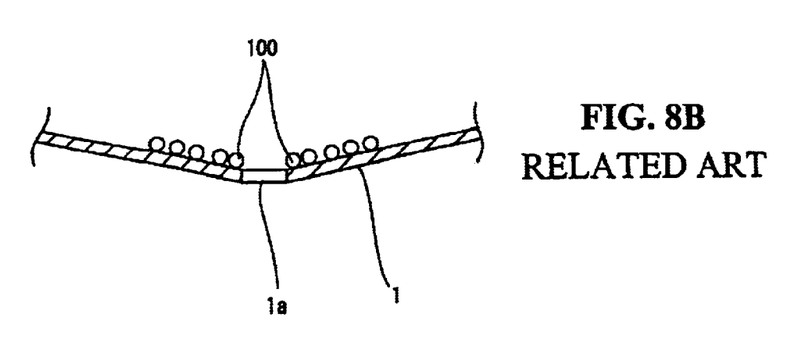
FIG. 8B shows the problem of the conventional drainage port.

When the drainage port 1a is formed at the lowermost portion of the inclined bottom wall 1, water can be drained from the drainage port 1a when a large amount of water has penetrated into the fuse box. On the other hand, when a small amount of water penetrates into the fuse box, as shown in FIG. 8B, droplets may stick to the periphery of the drainage port 1a of the bottom wall 1. In other words, water 100 may remain on the bottom wall 1. Therefore, the water 100 cannot be efficiently drained from the drainage port 1a.

Figure 9A:
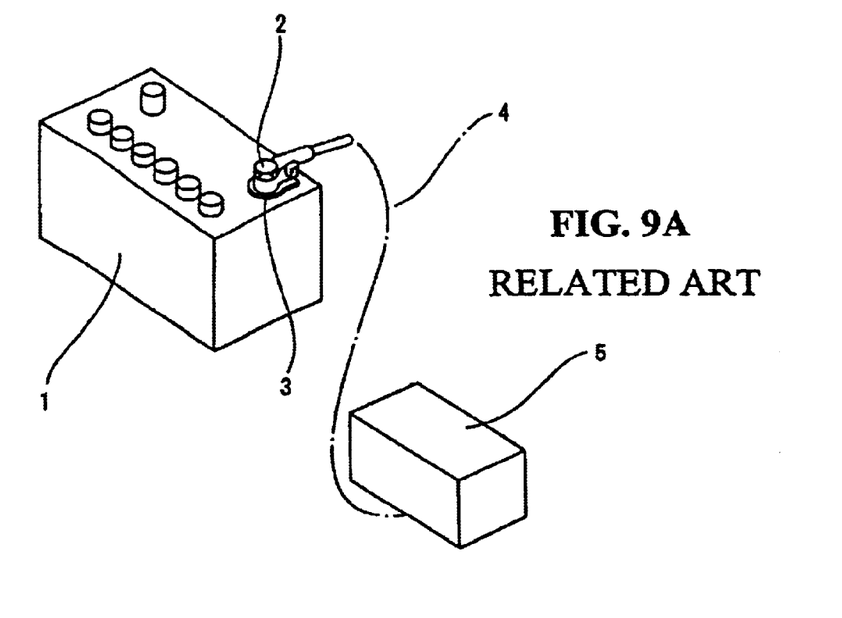
FIG. 9A is a perspective view showing the state of connection between a battery and a conventional fuse box accommodating a battery fuse.

As shown in FIG. 9, a battery terminal 3 connected to an end of a lead wire 4 is fitted on the periphery of a battery post 2 projecting from the upper surface of a battery 1. The lead wire 4 is wired to a fuse box 5 to connect the lead wire 4 to a fuse accommodated inside the fuse box 5.

Because this kind of the fuse box is disposed in the engine compartment proximate to the battery, water penetrates into the fuse box. Thus, it is necessary to efficiently drain the water that has penetrated into the fuse box to the outside.

In the fuse box 5 shown in FIG. 9A, it is necessary to connect the battery fuse and the battery 1 with each other through the lead wire 4. Thus, much time and labor are required, and a large number of component parts are required. In addition, a large installing space is required for the fuse box 5. There is a demand for a construction in which the fuse box 5 is directly mounted on the battery 1 to connect the battery fuse and the battery 1 to each other without using the lead wire 4. In this case, the fuse box accommodates the battery fuse, a bus bar connected to the terminal of the battery fuse, and a battery terminal connected to the bus bar to be connectedly fitted on the periphery of the battery post of the battery.

Figure 9B:
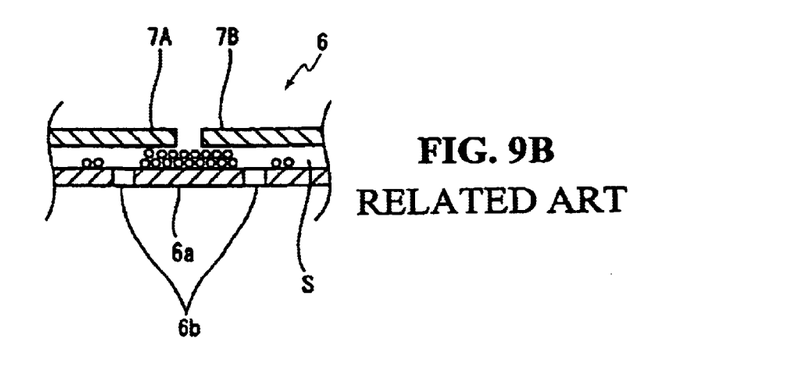
FIG. 9B shows the problem of the conventional fuse box.

Because the fuse box is mounted on the upper surface of the battery, it is desirable to reduce the height of the fuse box as much as possible. Therefore, as shown in FIG. 9B, a gap S is very short between the bus bar 7 accommodated in the box 6 and the bottom wall 6a of the box 6. However, water sticks to the periphery of the drainage port 6b of the bottom wall 6a. Consequently, even a small amount of water collected in the gap S may cause a current leak or electrical short to occur between adjacent bus bars 7A and 7B through the water.

SUMMARY OF THE INVENTION

The present invention has been made in view of the above-described problem. Accordingly, it is an object of the present invention to provide an electric parts accommodation box having a structure capable of draining even a small amount of water from a drainage port to prevent a current leak or electrical short from occurring between electric parts, such as bus bars, when the length of the gap between a bottom wall of the electric parts accommodation box and the electric parts is short.

To achieve the object, according to the present invention, there is provided a drainage structure of an electric parts accommodation box including a drainage port formed on a bottom wall thereof; a cut-out portion, continuous with the drainage port, a tip of which tapers off to form an acute angle; and a water-leading groove, continuous with the tip, formed on an outer surface of the bottom wall. With this, a droplet that sticks to the water-leading groove disposed on the outer surface of the bottom wall is brought into contact with a droplet that sticks to the tip of the cut-out portion disposed on an inner surface of the bottom wall to flow out a droplet that sticks to a peripheral edge of the drainage port to the outer surface of the bottom wall.

A thin inclined portion may be formed on the outer surface of the bottom wall toward the peripheral edge of the drainage port. The water-leading groove is formed on the inclined portion. The water-leading groove allows droplets drawn out to the outside from the tip of the cut-out portion to be drained easily from the electric parts accommodation box.

Preferably, the drainage port has an approximately square central hole approximately square and a triangular cut-out portion formed at a center of at least one side of the central hole. The triangular cut-out portion is continuous with the central hole. The tip of the triangular cut-out portion is continuous with a tip of the water-leading groove.

Since the central hole is continuous with the triangular cut-out portion, droplets sticking to the peripheral edge of the drainage port can be collected easily to the tip of the cut-out portion. Since the tip of the triangular cut-out portion is continuous with the tip of the water-leading groove, it is possible to smoothly drain droplets sticking to the inner surface of the bottom wall.

The drainage structure of the electric parts accommodation box includes a fuse box, mounted on an upper surface of the battery box, that accommodates a battery fuse and bus bars connected to terminals of the battery fuse. With this, a battery terminal to be fixed to a periphery of a battery post projecting from the upper surface of the battery box is connected to the bus bars. Also, the drainage port and the water-leading groove are formed on a lower case of the fuse box so that water that has penetrated into the fuse box is drained from the drainage port.

The drainage port and the water-leading groove are formed on a lower case of the fuse box so that water that has penetrated into the fuse box is drained from the drainage port.

According to experiments conducted by the inventors, it has been demonstrated that when a droplet that sticks to the tip of the cut-out portion continuous with the drainage port disposed on the inner surface of the bottom wall of the electric parts accommodation box contacts and coalesces a droplet that sticks to a tip of the water-leading groove disposed on the outer surface of the bottom wall thereof, the droplet on the inner surface of the bottom wall is drawn out to the outer surface of the bottom wall.

The fuse box, accommodating the battery fuse, has the above-described construction to reliably draining water which has collected on the inner surface of the bottom wall of the lower case thereof to the outside. Thus, it is possible to prevent a current leak from occurring between bus bars, even though the lower case and the bus bars are disposed proximately.

BRIEF DESCRIPTION OF THE DRAWINGS

Various exemplary embodiments of the present invention will be described below with reference to the drawings, wherein.

DETAILED DESCRIPTION OF PREFERRED EMBODIMENTS

FIGS. 1 through 6 show a first embodiment of the present invention in which a fuse box 11 is disposed on a battery box 40 mounted inside an engine compartment. A case of the fuse box 11 includes a lower case 12, an upper case 13, and an intermediate case 14 that fixedly accommodates a battery fuse 10, an input-side bus bar 15 connected to a terminal of the battery fuse 10, and an output-side bus bar 16 also connected to the terminal of the battery fuse 10. A battery terminal 20 to be fixed to the periphery of a battery post 41 of the battery box 40 is fastened to the input-side bus bar 15 to electrically connect the battery fuse 10 to a battery. Battery post 41 projects from an upper surface of the battery box 40.

Figure 1:
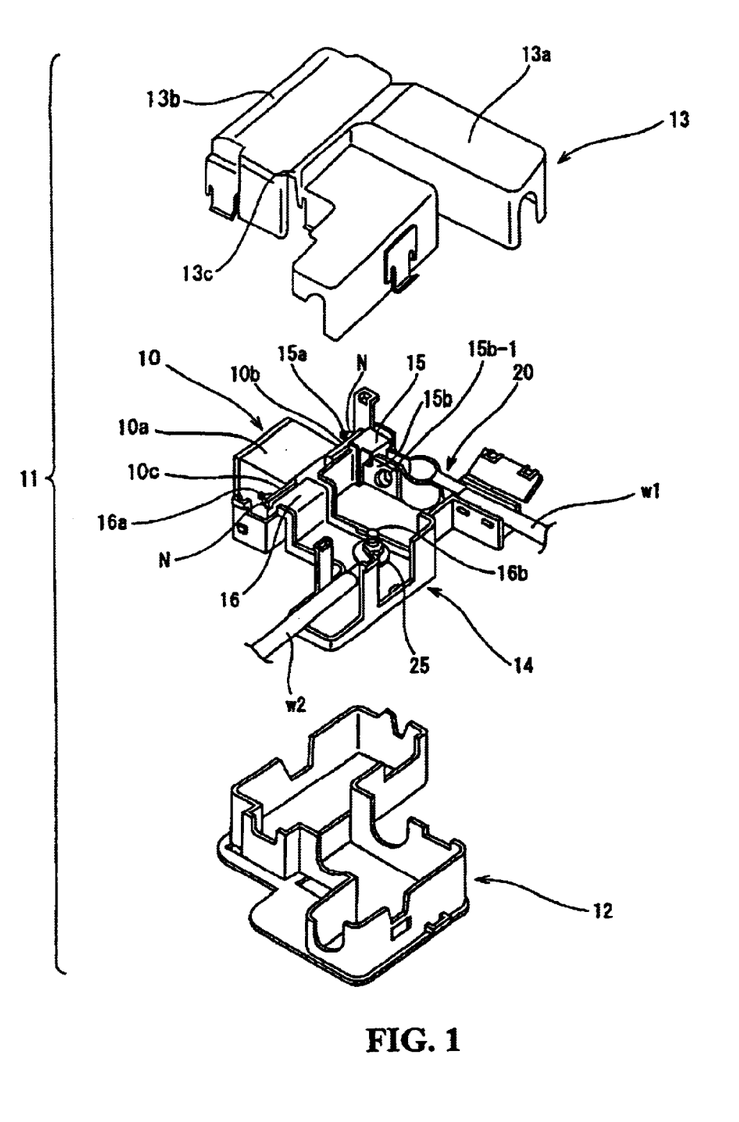
FIG. 1 is an exploded perspective view showing a fuse box according to an embodiment of the present invention.

More specifically, one end of the input-side bus bar 15 overlaps an input terminal 10b projecting horizontally from one side of a bottom surface of a body 10a of the battery fuse 10. One end of the output-side bus bar 16 overlaps an output terminal 10c projecting horizontally from the other side of the bottom surface of the body 10a of the battery fuse 10. Screw portions 15a and 16a projecting from the input-side bus bar 15 and the output-side bus bar 16, respectively, penetrate through a through-hole (not shown) of the input terminals 10b and a through-hole (not shown) of the output terminal 10c, respectively, and are fixed with a nut N. The intermediate case 14 accommodates the battery fuse 10, the input-side bus bar 15, and the output-side bus bar 16.

After the input-side bus bar and the output-side bus bar are accommodated in the intermediate case, it is possible to fasten the input-side bus bar to the input terminal of the battery fuse with a bolt and fasten the output-side bus bar to the output terminal of the battery fuse with a bolt.

The intermediate case 14 in which the battery fuse 10, the input-side bus bar 15, and the output-side bus bar 16 are disposed is mounted on the lower case 12, and the upper case 13 is mounted on the lower case 12. A slight gap S1 (see FIG. 4) is generated between the intermediate case 14 and the lower case 12 in this assembling.

An opening 14a is formed in penetration through the intermediate case 14 so that the input-side bus bar 15 and the output-side bus bar 16 can relieve radiated heat. At the position where the opening 14a is disposed, the lower case 12 is mountably disposed in confrontation with the intermediate case 14.

Figure 3:
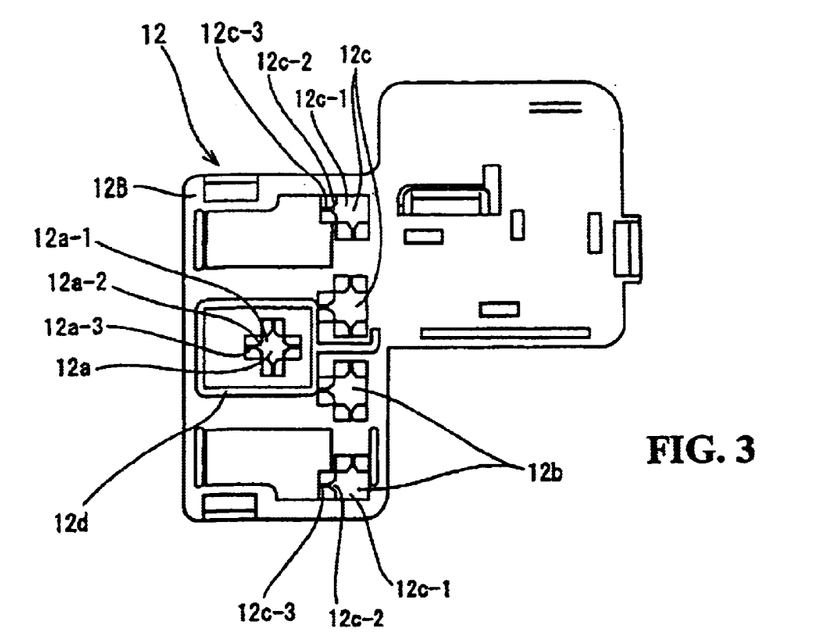
FIG. 3 is a bottom view showing a lower case forming a bottom wall of the fuse box.

As shown in FIG. 3, a drainage port 12a is formed in an outer surface 12B of a bottom wall of the lower case 12 at the position where the battery fuse 10 is disposed, a drainage port 12b is formed at the position where the input-side bus bar 15 is disposed, and a drainage port 12c is formed at the position where the output-side bus bar 16 is disposed. A droplet-dividing rib 12d having a predetermined height is projectingly formed between the drainage ports 12a and 12b, between the drainage ports 12b and 12c, and between the drainage ports 12c and 12a.

Figure 5A:
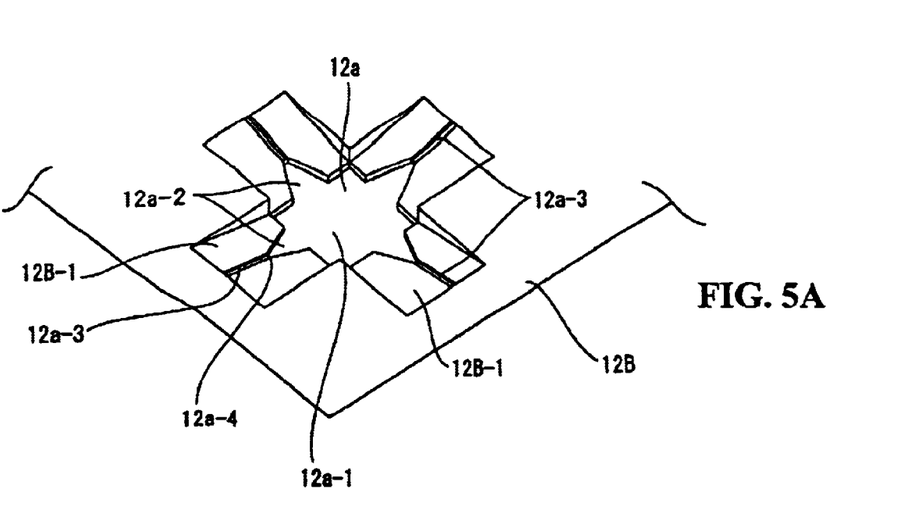
FIG. 5A is a perspective view showing a drainage port.
Figure 5B:
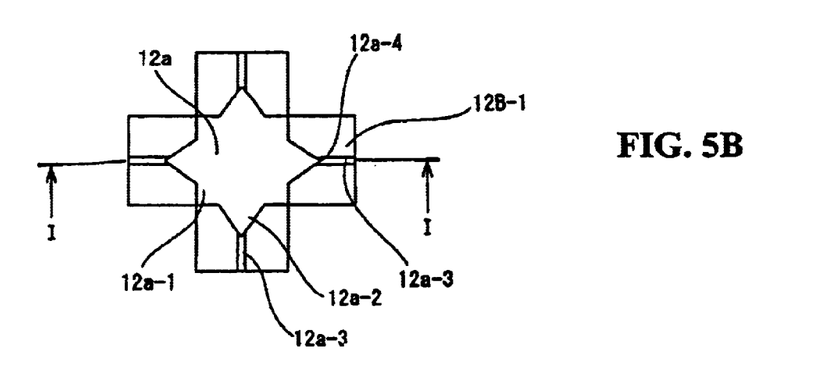
FIG. 5B is a plan view showing the drainage port.
Figure 5C:
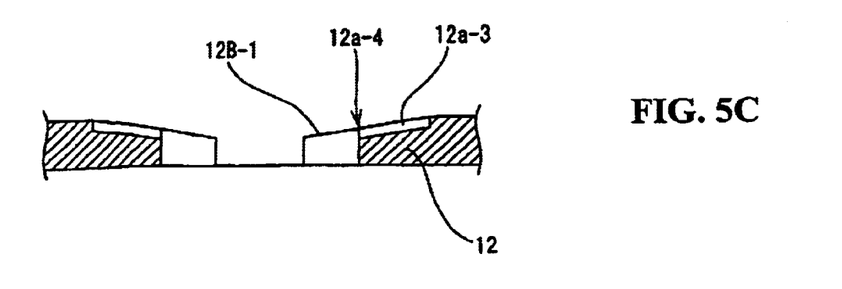
FIG. 5C is a sectional view taken along a line I—I of FIG. 5B.

As shown in FIG. 5, the drainage port 12a is provided with an approximately square central hole 12a-1 and a generally triangular cut-out portion 12a-2 formed by outwardly cutting the four sides of the central hole 12a-1 at the central position of each side.

Four upwardly inclined portions 12B-1 are formed toward the four sides of the central hole 12a-1 on a lower-side outer surface 12B of the lower case 12. A water-leading groove 12a-3 continuous with the tip of each of the cut-out portions 12a-2 is formed at the central position of each of the upwardly inclined portions 12B-1.

An inner surface 12A of the lower case 12 at its upper side is gently declined toward the drainage port 12a to flow water which has collected in the lower case 12 toward the drainage port 12a.

The tip of the triangular cut-out portion 12a-2 of the drainage port 12a and the tip of the tip of the water-leading groove 12a-3 formed on the outer surface of the lower case 12 are continuous with each other through a thin continuous portion 12a-4. Thus, the inner and outer surfaces of the lower case 12 can be made continuous with each other.

The configuration of the drainage ports 12b and 12c is similar to that of the drainage port 12a. The drainage ports 12b and 12c are formed at positions adjacent to a side wall of the lower case 12 near a lower surface thereof. Thus, cut-out portions 12b-2 and 12c2 and water-leading grooves 12b-3 and 12c-3 may be formed on two or three sides of the central hole 12a-1, instead of all four sides as in the previous example.

In the upper case 13, one half serves as an opening/closing cover 13a. A hinge 13c is interposed between the opening/closing cover 13a and another half 13b locked to the lower case 12 to open and close the opening/closing cover 13a.

Figure 2:
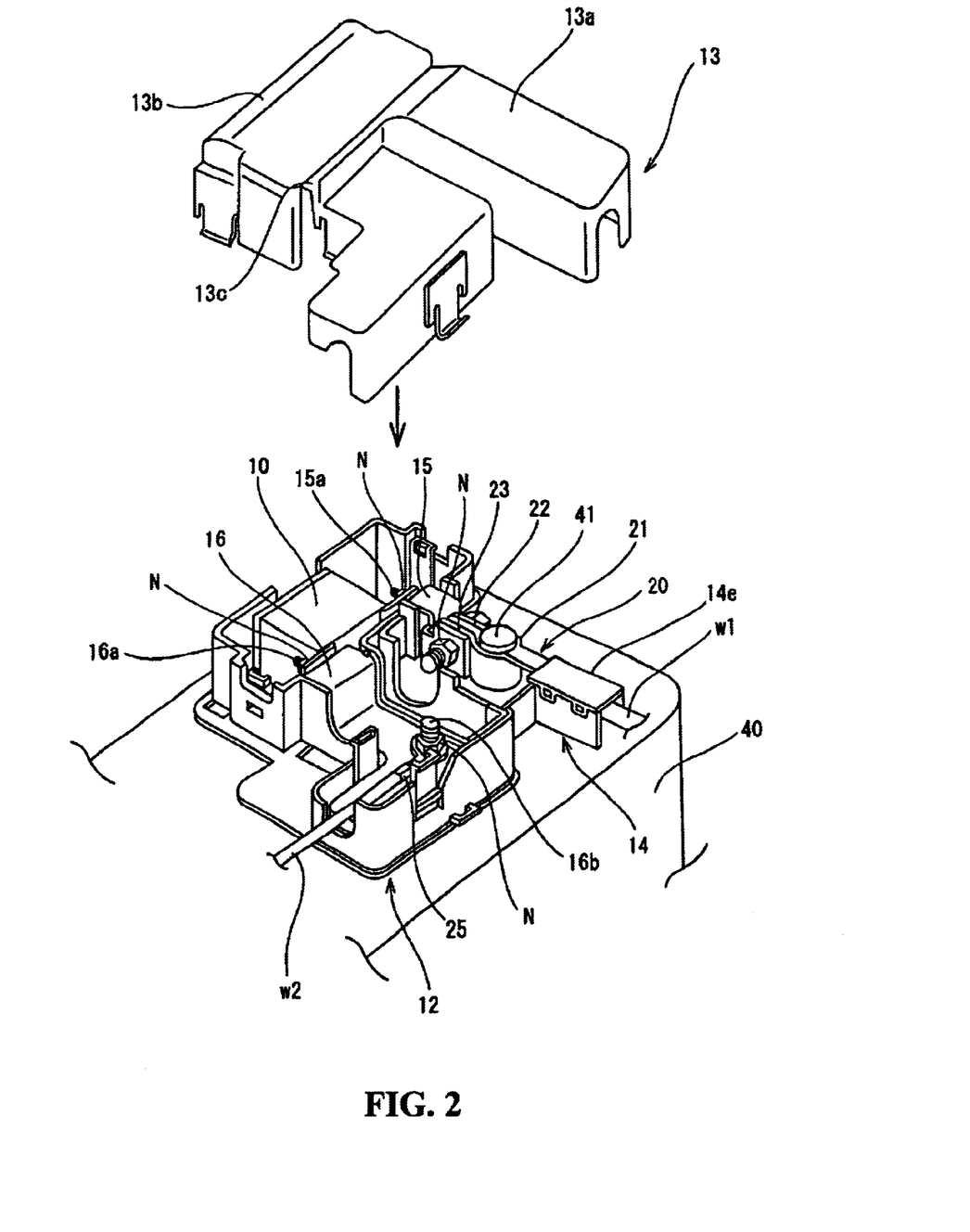
FIG. 2 is a perspective view showing a state in which the fuse box is mounted on an upper surface of a battery box.

The fuse box 11 having the above-described construction is mounted on the upper surface of the battery box 40. The battery terminal 20 connectable to battery post 41 of battery box 40 is accommodated in the fuse box 11 and connected to the input-side bus bar 15.

More specifically, a circular-arc portion 21 of the battery terminal 20 projects from a to-be-crimped portion which is crimped to the tip of an electric wire w1 of a power circuit. A tightening piece 22 projects from the tip of the circular-arc portion 21 at its one side, whereas a tightening piece 23 making a pair with the tightening piece 22 projects from the tip of the circular-arc portion 21 at its other side. A bolt opening (not shown) is formed on each of the tightening pieces 22 and 23.

As shown in FIG. 2, the electric wire w1 is accommodated in an electric wire accommodation portion 14e of the intermediate case 14 and not extended to the position corresponding to the circular-arc portion 21 of the battery terminal 20. The circular-arc portion 21 is exposed to the outside to fit it on the battery box 40.

The other end portion of the input-side bus bar 15 is extended to a position where the other end portion overlaps the side of the tightening piece 23 to form a connection piece 15b through which a bolt opening 15b-1 communicating with the bolt opening (not shown) of the tightening pieces 22 and 23 is formed.

A screw portion 16b projects upward from the upper surface of the output-side bus bar 16 at an intermediate position of the other side thereof With the nut N, a terminal 25 is fastened to an end of an electric wire w2 to be connected to a relay box (not shown).

The method of fixing the fuse box 11 to the battery box 40 is described below.

Initially the fuse box 11 is disposed over the battery box 40. Then, the circular arc portion 21 of the battery terminal 20 is fitted on the periphery of the battery post 41. With the bolt opening (not shown) of each of the tightening pieces 22, 23 and the bolt opening 15b-1 of the connection piece 15b of the input-side bus bar 15 overlapping each other, the bolt B is inserted through the bolt openings and fastened with the nut N. This fits circular arc portion 21 on the periphery of the battery post 41. In this operation, the battery and the battery fuse 10 are electrically connected to each other, and the fuse box 11 is fixed to the battery box 40. Then, the opening/closing cover 13a of the upper cover 13 is closed to lock the upper cover 13 to the lower cover 12.

Figure 4:
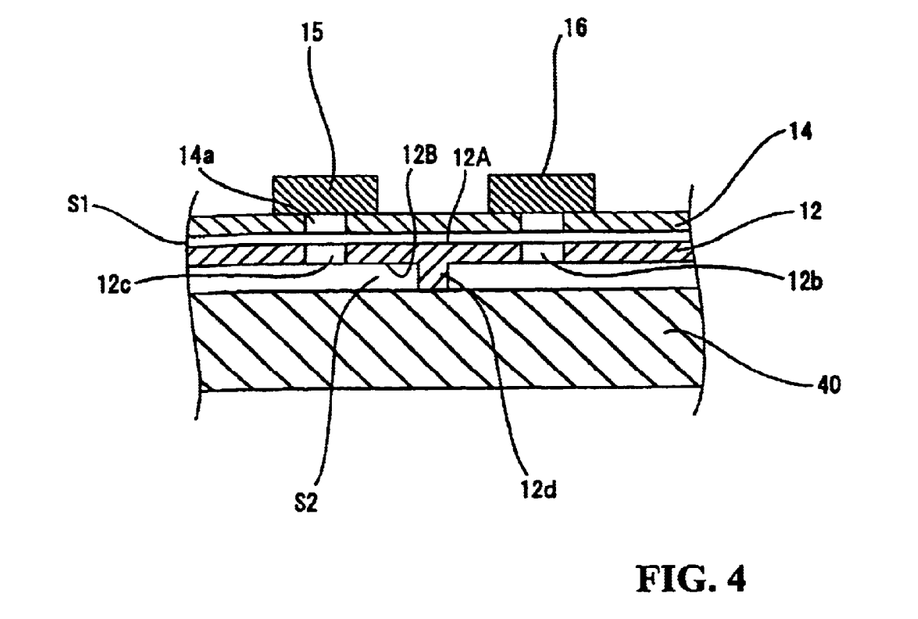
FIG. 4 is a sectional view showing main parts of the electric parts accommodation box.

At this time, as shown in FIG. 4, the droplet-dividing rib 12d projecting from the outer surface 12B of the bottom wall of the lower case 12 contacts the upper surface of the battery box 40, and a small gap S2 is formed between the outer surface 12B of the lower case 12 and the battery box 40.

If water penetrates into the fuse box 11 mounted on the upper surface of the battery box 40, as described above, water collects in the small gap S1 formed between the intermediate case 14 and the lower case 12. In this case, water 100 flows down to the drainage ports 12a through 12c along the inner surface 12A of the lower case 12. If the amount of the water 100 is large, the water 100 flows out from the drainage port 12a and is discharged to the small gap S2 formed between outer surface 12B of the lower case 12 and the battery box 40.

On the other hand, if a small amount of water 100 flows to the drainage ports 12a through 12c along the inner surface 12A of the lower case 12, a droplet 100a sticks to the peripheral edge of the drainage ports 12a through 12c, namely, the peripheral edge of the central hole 12a-1 and that of the cut-out portion 12a-2 and does not flow out from the drainage ports 12a through 12c.

Figure 6:
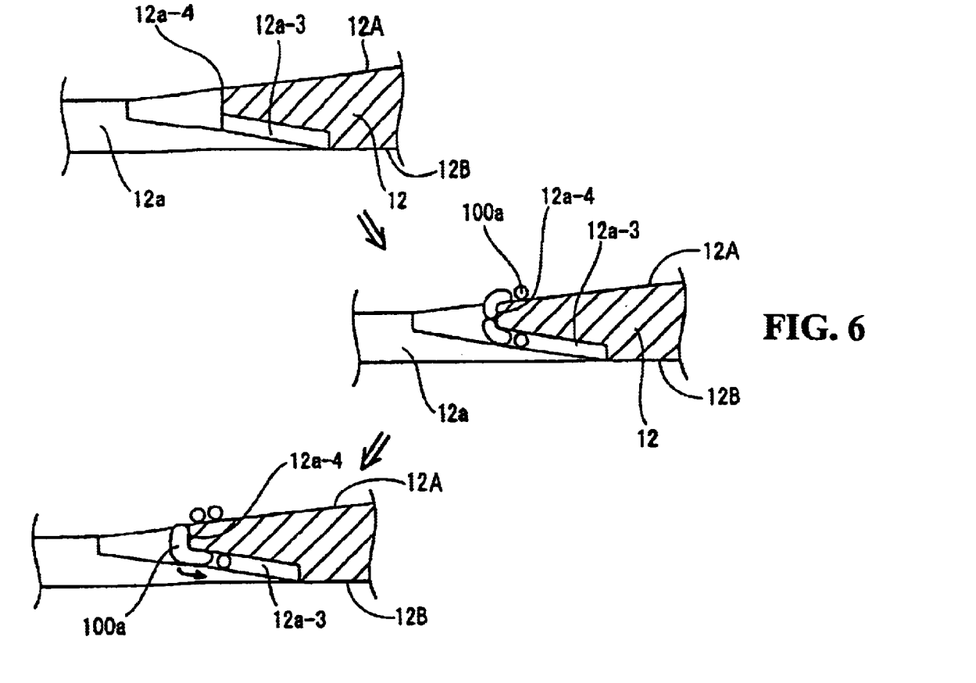
FIG. 6 is an explanatory view for explaining the drainage operation of the present invention.

At the time of the water penetration, the droplet 100a sticks to the outer surface 12B of the lower case 12 and to the water-leading groove 12a-3. As shown in FIG. 6, the droplet 100a that has stuck to the tip of the water-leading groove 12a-3 and the droplet 100a that has stuck to the tip of the cut-out portion 12a-2 (FIG. 2) contact each other at the thin continuous portion 12a-4. When the droplet 100a on the outer surface 12B of the lower case 12 and the droplet 100a on the inner surface 12A thereof contact each other and coalesce therewith, the former acts in such a way as to draw out the latter from the inner surface 12A of the lower case 12. Consequently, the droplet 100a flows out through the water-leading groove 12a-3.

As described above, the droplet present on the outer surface of the lower case 12 contacts and coalesces the droplet that has collected in the slight gap S1 between the intermediate case 14 and the inner surface 12A of the lower case 12, with the droplet sticking to the peripheral edge of the drainage ports 12a through 12c at the side of the inner surface 12A of the lower case 12. Thereby, it is possible to discharge the droplet to the outside through the drainage ports 12a through 12c. Thus, it is possible to prevent water from collecting in the slight gap S1 between the intermediate case 14 and the inner surface 12A of the lower case 12. That is, it is possible to prevent water from penetrating into the opening 14a of the intermediate case 14. Thereby, it is possible to prevent a current leak or electrical short from occurring between the input-side bus bar 15 and the output-side bus bar 16.

Figure 7A:
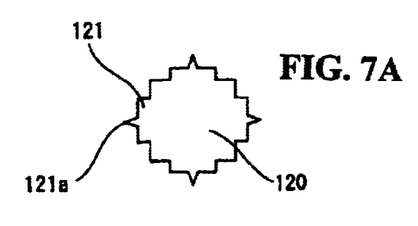
FIGS. 7A, 7B, and 7C are schematic views showing modifications of a cutout portion of the drainage port.
Figure 7B:
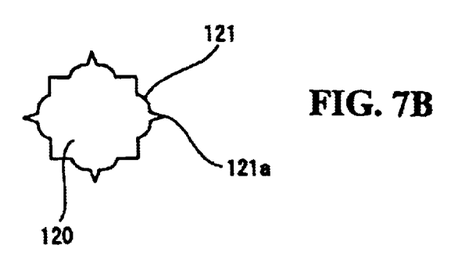
Figure 7C:
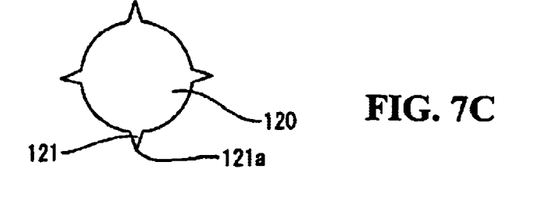

The present invention is not limited to the above-described embodiment. For example, a drainage port 120 and a cut-out portion 121 continuous therewith may be shaped, as shown in FIGS. 7A, 7B, and 7C. That is, it is possible to adopt any drainage port 20 having a cut-out portion 121 and a tip 121a tapering off to form an acute angle.

The electric parts accommodation box is used not only as the fuse box, but also as boxes accommodating electric component parts. The water-leading groove continuous with the peripheral edge of the drainage port formed on the bottom wall of the electric parts accommodation box is disposed on the outer surface of the bottom wall of the electric parts accommodation box. Therefore, the droplet sticking to the tip of the water-leading groove disposed on the outer surface of the bottom wall of the electric parts accommodation box contacts and coalesces the droplet sticking to the peripheral edge of the drainage port disposed on the inner surface of the bottom wall thereof. Thereby, the droplet can be drained by drawing it out to the outer surface of the bottom wall.

As apparent from the foregoing description, according to the present invention, the drainage port formed on the bottom wall of the electric parts accommodation box has the cut-out portion, the tip of which tapers off to form an acute angle and which is continuous with the central hole thereof. The water-leading groove continuous with the tip is formed on the outer surface of the bottom wall, with the tip of the water-leading groove and the peripheral edge of the drainage port continuous with each other. Therefore, the droplet sticking to the tip of the water-leading groove disposed on the outer surface of the bottom wall of the electric parts accommodation box contacts and coalesces the droplet sticking to the peripheral edge of the drainage port disposed on the inner surface of the bottom wall thereof. As a result of the coalescence of the droplets, the droplet sticking to the peripheral edge of the drainage port is guided out. In this manner, drainage can be accomplished reliably.

When the electric parts accommodation box is used as the fuse box accommodating the battery fuse, the droplet sticking to the inner surface of the bottom wall of the lower case can be completely drained, even though the bottom wall of the lower case and the bus bars is narrow. Thus, it is possible to prevent a current leak from occurring between bus bars.

Further since the fuse box is directly mounted on the battery box, space can be saved. The battery fuse and the battery post are connected to each other not with the lead wire but with the battery terminal. Thus, it is possible to improve reliability on the electric connection.

What is claimed is:

1. A drainage structure of an electric parts accommodation box comprising:
    a drainage port formed on a bottom wall of the box;
    a cut-out portion, continuous with said drainage port, wherein a tip of said cut-out portion off to form an acute angle; and
    a water-leading groove, continuous with said tip, formed on an outer surface of said bottom wall,
    wherein a droplet that sticks to said water-leading groove disposed on said outer surface of said bottom wall is brought into contact with a droplet that sticks to said tip of said cut-out portion disposed on an inner surface of said bottom wall to flow out a droplet that sticks to a peripheral edge of said drainage port to said outer surface of said bottom wall.

2. A drainage structure of an electric parts accommodation box according to claim 1, wherein a thin inclined portion is formed on said outer surface of said bottom wall toward said peripheral edge of said drainage port, said water-leading groove being formed on said inclined portion.

3. A drainage structure of an electric parts accommodation box according to claim 2, wherein multiple cut-out portions and water-leading grooves are spaced around the periphery of said drainage port.

4. A drainage structure of an electric parts accommodation box according to claim 3, wherein at least three cut-out portions and water-leading grooves are provided.

5. A drainage structure of an electric parts accommodation box according to claim 3, wherein the multiple cut-out portions and water-leading grooves are spaced at approximately 90° intervals.

6. A drainage structure of an electric parts accommodation box according to claim 1, wherein said drainage port has an approximately square central hole and a generally triangular cut-out portion formed at a center of at least one side of said central hole, with said triangular cut-out portion being continuous with said central hole and with a tip of said triangular cut-out portion being continuous with a tip of said water-leading groove.

7. A drainage structure of an electric parts accommodation box according to claim 1, comprising a fuse box, mounted on an upper surface of a battery box and accommodating a battery fuse and bus bars connected to terminals of said battery fuse,
    a battery terminal connected to said bus bars, said battery terminal being fixable to a periphery of a battery post; and
    said drainage port and said water-leading groove are formed on said outer surface of said bottom wall of said fuse box so that liquid that has penetrated into said fuse box is drained from said drainage port.

8. A drainage structure of an electric parts accommodation box according to claim 7, wherein a plurality of drainage ports are formed on the bottom wall, one under said battery fuse and one under at least one of said bus bars.

9. A drainage structure of an electric parts accommodation box according to claim 1, wherein a plurality of drainage ports are formed on the bottom wall.

* * * * *